No. 781,807.                                    Patented February 7, 1905.

UNITED STATES PATENT OFFICE.

FRANKLIN R. CARPENTER, OF DENVER, COLORADO.

PROCESS OF SMELTING NATIVE-COPPER-BEARING ROCK.

SPECIFICATION forming part of Letters Patent No. 781,807, dated February 7, 1905.

Application filed January 23, 1903. Serial No. 140,222.

*To all whom it may concern:*

Be it known that I, FRANKLIN R. CARPENTER, a citizen of the United States, residing at Denver, in the county of Denver, State of Colorado, have invented an Improved Process of Smelting Native-Copper-Bearing Rock, of which the following is a specification.

My invention relates to the smelting of certain classes of ores containing native or metallic copper, such as the conglomerate ores of the Lake Superior region.

Certain conglomerates yield a large percentage of their copper contents to the ordinary mechanical process of stamping and water concentration, because the copper is coarse; but others, like the Nonesuch conglomerate, carry copper so finely divided that all attempts at winning it heretofore have signally failed. It has also been for a long time recognized that the mechanical concentration universally employed on such deposits is incomplete, so that there is a loss of copper in the tailings. I have discovered, however, that such ores may be cheaply and economically treated by a smelting process that gives most excellent results and which not only saves the finely-divided copper not heretofore saved, but also the gold and silver often found in these rocks and lost by present processes. Even those beds like the Calumet and Hecla in addition to the coarse copper carry some fine copper now lost in the tailing, as well as gold and silver, so that the process is applicable to all ores carrying native or metallic copper. These conglomerates are very silicious, many of them essentially sandstones requiring if smelted by ordinary smelting processes much iron flux; but I have found that very clean slags may be made with the use of limestone alone; but owing to the very small quantities of copper when compared with the large quantity of slag formed it becomes necessary to add a carrier or collector for the copper. I add, therefore, some sulfid material, such as iron pyrite, pyrrhotite, or copper pyrite or other sulfid, which collects the finely-disseminated native copper by a reaction well known, but never before to my knowledge employed for this purpose. The metallic copper unites with the sulfur-displacing iron and forms matte, which, having a greater specific gravity than the slag, is easily separated in suitable settlers from it.

In the carrying out of my invention I use any ordinary blast-furnace, such as is now employed in the ordinary processes of smelting. I add to the copper conglomerate a sufficient quantity of limestone or other basic material and sufficient pyrite material to form a matte, charging the same with sufficient coke or charcoal into any suitable blast-furnace and smelting the same by application of a blast. There is formed in the furnace a very light slag and a very high grade matte, the former free, or nearly so, from copper and the latter containing the copper now in the form of sulfid that formerly existed in the conglomerate in the free state. The sulfid-bearing material to be added to the furnace charge should be sufficient to theoretically satisfy the copper; but the presence of an excess would be immaterial. The matte when separated from the slag may be subjected to any usual or desired process for the recovery of values.

I claim as my invention—

1. The process of smelting native-copper-bearing rock which consists in smelting the same with a flux and sulfur, substantially as described.

2. The process of smelting native-copper-bearing rock, which consists in smelting the same with a basic flux and sulfur, substantially as described.

3. The process of smelting native-copper-bearing rock which consists in adding thereto basic material, to form a slag and a sulfid material to form a matte or carrier for the native copper and incidentally the gold and silver that may be present and smelting the mixture.

4. The process of smelting native-copper-bearing rock which consists in smelting the same with lime and sulfur bearing material, substantially as described.

5. The process of smelting native-copper-bearing rock which consists in adding thereto basic and sulfid materials and smelting the same to cause the basic material to unite with the rock to form a slag and the sulfur to unite with the copper to form a matte of greater specific gravity than the slag.

6. The process of smelting native-copper-bearing rock which consists in adding thereto basic material and pyrites and smelting the same.

7. The process of smelting native-copper-bearing rock which consists in adding thereto lime and iron pyrites and smelting the same.

In testimony whereof I have hereunto subscribed my name.

FRANKLIN R. CARPENTER.

Witnesses:
I. A. VENABLE,
GEO. K. HELDEN.